United States Patent
Jansky et al.

(10) Patent No.: US 12,188,499 B2
(45) Date of Patent: Jan. 7, 2025

(54) DISRUPTING FLUID FLOW IN A FLUID RESERVOIR

(71) Applicant: Fresh Health Inc., Mountain View, CA (US)

(72) Inventors: Molly Jean Jansky, Menlo Park, CA (US); Bruce Michael Schena, Menlo Park, CA (US)

(73) Assignee: Fresh Health Inc., Mountain View, CA (US)

( * ) Notice: Subject to any disclaimer, the term of this patent is extended or adjusted under 35 U.S.C. 154(b) by 0 days.

(21) Appl. No.: 18/134,248

(22) Filed: Apr. 13, 2023

(65) Prior Publication Data

US 2024/0344539 A1    Oct. 17, 2024

(51) Int. Cl.
*F15D 1/00* (2006.01)
*A61C 17/02* (2006.01)
*A61C 17/024* (2006.01)

(52) U.S. Cl.
CPC ........ *F15D 1/0005* (2013.01); *A61C 17/0211* (2013.01); *A61C 17/024* (2019.05)

(58) Field of Classification Search
CPC . F15D 1/0005; A61C 17/0211; A61C 17/024; F04D 29/708
See application file for complete search history.

(56) References Cited

U.S. PATENT DOCUMENTS

| | | | | |
|---|---|---|---|---|
| 4,658,449 A | * | 4/1987 | Martin | E04H 4/1236 210/162 |
| 5,382,003 A | * | 1/1995 | Sankaranarayanan | B22D 43/001 266/236 |
| 5,544,695 A | * | 8/1996 | Harasym | B22D 41/50 164/337 |
| 6,591,867 B2 | * | 7/2003 | Grayson | B64G 1/4021 137/561 A |
| 2013/0295520 A1 | * | 11/2013 | Hsieh | A61C 17/02 433/89 |
| 2015/0173850 A1 | * | 6/2015 | Garrigues | A61C 17/0202 433/80 |
| 2018/0080484 A1 | * | 3/2018 | Venkatesan | E04D 13/0767 |
| 2021/0085436 A1 | * | 3/2021 | Evans | A61C 17/0202 |
| 2023/0200958 A1 | * | 6/2023 | Garrigues | A61C 17/0202 433/80 |

* cited by examiner

*Primary Examiner* — Justine R Yu
*Assistant Examiner* — Matthew R Moon
(74) *Attorney, Agent, or Firm* — Van Pelt, Yi & James LLP (57) ABSTRACT

An oral care system includes a fluid reservoir, a check intake valve, and a pump configured to cause fluid to be provided from fluid reservoir to an oral insert of the oral care system via the check intake valve. The fluid reservoir includes one or more fluid flow disrupters. The check intake valve is located at an offset from a center of the fluid reservoir.

12 Claims, 10 Drawing Sheets

DISRUPTING FLUID FLOW IN A FLUID RESERVOIR

BACKGROUND OF THE INVENTION

An oral care system at least includes a fluid reservoir, a pump, and an oral insert. The oral insert includes a plurality of manifolds and a plurality of fluid openings. The oral insert is coupled to the pump. The fluid reservoir includes an opening at a bottom surface of the fluid reservoir. Fluid is introduced into the fluid reservoir. A user may insert the oral insert into their mouth and subsequently turn on the oral care system. The plurality of fluid openings are located at locations customized to the oral anatomy of the user. When the oral care system is turned on, the pump causes fluid to exit the fluid reservoir and to be directed towards the oral anatomy of the user via the plurality of manifolds and the plurality of fluid openings.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An oral care system disclosed herein is designed to clean the entire oral anatomy of a user within a short period of time (e.g., less than 10 seconds). As a result, the pump needs to have a strong motor (e.g., 180 W-200 W) to provide the fluid from the reservoir to all of the plurality of fluid openings of the oral insert within the short period of time. This may cause the fluid exiting the fluid reservoir to have a flow rate between 70 ml/s and 100 ml/s.

In contrast, a water flosser is designed to clean the oral anatomy of the user over a longer period of time (e.g., 2 minutes). As a result, the pump of the water flosser does not need to be as powerful (e.g., 10 W) as the pump of the oral care system. The flow rate of water exiting a water flosser reservoir is approximately 10 ml/s.

A bottom portion of the fluid reservoir includes a check intake valve. A vortex may be created when fluid exits the fluid reservoir at a high flow rate (e.g., 70 ml/s-100 ml/s). The size of the vortex depends on a flow rate of fluid entering the check intake valve. The vortex may cause air (e.g., compressible air bubbles) to be introduced into the oral care system via the check intake valve. This reduces the water pressure exiting the plurality of nozzles associated with the oral insert. As a result, the efficacy of the oral care treatment is reduced.

U.S. Pat. No. 11,141,249 describes a vortex plate that is situated within the interior of a fluid reservoir. The vortex plate disposed over the check intake valve may be configured such that there is a gap between the vortex plate and the check intake valve. The positioning of the vortex plate may allow for the lateral flow of fluid from the side so that the fluid flow is not co-linear or co-axial with the direction of fluid flow through the check intake valve. Directing the fluid to flow toward the check intake valve from the side instead of directly in-line with the check intake valve may help prevent the formation of a vortex. The vortex plate may be positioned above the check intake valve by support legs. The support legs may secure the vortex plate to the fluid reservoir by allowing a screw or other securing means to pass through the support legs. One problem with the vortex plate described in U.S. Pat. No. 11,141,249 is the ease of cleaning the oral care system. The vortex plate needs to be unscrewed from the support legs to be cleaned. Bacteria, such as *Serratia marcescens* or *Aureobasidium pullulans* may grow on the surfaces of the vortex plate if the vortex plate is not regularly cleaned. The need to unscrew the vortex plate from the support legs may be an obstacle for some users to regularly clean the fluid reservoir.

Techniques to reduce or prevent the formation of a vortex within the fluid reservoir are disclosed herein. The disclosed techniques also allow the fluid reservoir to easily be cleaned to prevent the growth of bacteria. In a first technique, the fluid reservoir includes a fluid flow disrupter located at a bottom surface of the fluid reservoir. The fluid flow disrupter includes a plurality of support legs. Magnetic material (e.g., iron, nickel, cobalt, etc.) may be included in some or all of the support legs. A magnetic ring or other shape may be embedded in a top surface of a check intake valve associated with the fluid reservoir. The support leg(s) that include the magnetic material may be aligned with the magnetic ring or other shape. When the oral care system is operating, the fluid flow disrupter may allow for the lateral flow of fluid from the side so that the fluid flow is not co-linear or co-axial with the direction of fluid flow through the check intake valve. After operation of the oral care system is complete, the fluid flow disrupter may be easily removed from the fluid reservoir by a user. The user may remove the fluid flow disrupter from the fluid reservoir for cleaning by pulling the fluid flow disrupter away from the magnetic ring or other shape that is embedded in the top surface of the check intake valve. Unlike the vortex plate disclosed in U.S. Pat. No. 11,141,249, no tools are needed to remove the fluid flow disrupter from the fluid reservoir.

In a second technique, a fluid flow disrupter may be submerged in a liquid that is included in the fluid reservoir. When the oral care system is turned on, the fluid flow disrupter may reduce the size of a vortex or prevent the vortex from forming within the liquid.

In a third technique, the fluid reservoir includes a plurality of fluid flow disrupters and a check intake valve. The fluid reservoir may include 2: n fluid flow disrupters. In some embodiments, a number of fluid flow disrupters is even. In some embodiments, a number of fluid flow disrupters is odd. In some embodiments, the shape of the plurality of fluid flow disrupters is the same. In some embodiments, the shape of at least one of the plurality of fluid flow disrupters is different than the other fluid flow disrupters. The degree to which the plurality of fluid flow disrupters are able to reduce or prevent a vortex from forming within the fluid reservoir depends on the manner in which fluid is introduced into the fluid reservoir. In some embodiments, fluid is introduced to the fluid reservoir at an angle. For example, a user may lean the fluid reservoir under a water faucet and fill the fluid reservoir at an angle. The oral care system is subsequently turned on when the fluid is not in a still state and a vortex may immediately appear in the fluid reservoir as a result. In some embodiments, fluid is introduced to the fluid reservoir and the fluid is in a still state. The oral care system is subsequently turned on and a vortex does not appear in the fluid reservoir.

In some embodiments, the plurality of fluid flow disrupters may be equidistant from a center of the check intake valve. The angle between fluid flow disrupters and a center of the check intake valve is substantially equal (e.g., within a manufacturing threshold of 1°). For example, the fluid reservoir may include three fluid flow disrupters. A first angle between a first fluid flow disrupter, a second fluid flow disrupter, and the center of the check intake value is approximately 120° (e.g., within a manufacturing threshold of 1°). A second angle between the second fluid flow disrupter, a third fluid flow disrupter, and the center of the check intake valve is approximately 120°. A third angle between the third fluid flow disrupter, the first fluid flow disrupter, and the center of the check intake valve is approximately 120°.

In another example, the fluid reservoir may include five fluid flow disrupters. A first angle between a first fluid flow disrupter, a second fluid flow disrupter, and a center of the check intake value is approximately 72° (e.g., within a manufacturing threshold of) 1°. A second angle between the second fluid flow disrupter, a third fluid flow disrupter, and a center of the check intake valve is approximately 72°. A third angle between the third fluid flow disrupter, a fourth fluid flow disrupter, and a center of the check intake valve is approximately 72°. A fourth angle between the fourth fluid flow disrupter, a fifth fluid flow disrupter, and a center of the check intake valve is approximately 72°. A fifth angle between the fifth fluid flow disrupter, the first fluid flow disrupter, and a center of the check intake valve is approximately 72°.

A fluid flow disrupter has a proximal end that is adjacent to the check intake valve and a distal end. In some embodiments, a height of a fluid flow disrupter at the proximal end is the same as the height of the fluid flow disrupter at the distal end. In some embodiments, a side profile of the fluid flow disrupter decreases in height from the proximal end to the distal end. In some embodiments, a side profile of the fluid flow disrupter increases in height from the proximal end to the distal end. In some embodiments, the side profile of the fluid flow disrupter has a slope of zero. In some embodiments, the side profile of the fluid flow disrupter has a negative slope. In some embodiments, the side profile of the fluid flow disrupter has a positive slope.

In some embodiments, all of the fluid flow disrupters have a slope of zero. In some embodiments, all of the fluid flow disrupters have a negative slope. In some embodiments, all of the fluid flow disrupters have a positive slope. In some embodiments, the plurality of fluid flow disrupters have a combination of zero slope, negative slope, and/or positive slope.

The ability of the plurality of fluid flow disrupters to reduce or prevent a vortex from forming within the fluid reservoir is based on a height associated with the plurality of fluid flow disrupters. The ability of the plurality of fluid flow disrupters to reduce or prevent a vortex from forming improves as the height associated with the plurality of fluid flow disrupters increases. The height of a fluid flow disrupter is at least 0.5 cm. The ability of the plurality of fluid flow disrupters to reduce or prevent the vortex from forming within the fluid reservoir may plateau at a particular height. In some embodiments, the height of a fluid flow disrupter is between 0.5 cm and 1 cm. In some embodiments, the height of a fluid flow disrupter is 0.75 cm.

The ability of the plurality of fluid flow disrupters to reduce or prevent a vortex from forming within the fluid reservoir is based on a length associated with the plurality of fluid flow disrupters. The ability of the plurality of fluid flow disrupters to reduce or prevent a vortex from forming improves as the length associated with the plurality of fluid flow disrupters increases. A length of a fluid flow disrupter is at least 1 cm. In some embodiments, the length of a fluid flow disrupter is between 1 cm and 3 cm. In some embodiments, the length of the flow fluid flow disrupter is 1.5 cm.

The ability of the plurality of fluid flow disrupters to reduce or prevent a vortex from forming within the fluid reservoir is based on a width associated with the plurality of fluid flow disrupters. The ability of the plurality of fluid flow disrupters to reduce or prevent a vortex from forming improves as the width associated with the plurality of fluid flow disrupters increases. In some embodiments, the width of a fluid flow disrupter is at least 1 mm. In some embodiments, the width of a fluid flow disrupter is between 1 mm and 5 mm. In some embodiments, the width of a fluid flow disrupter is 2.25 mm.

Figure 1:
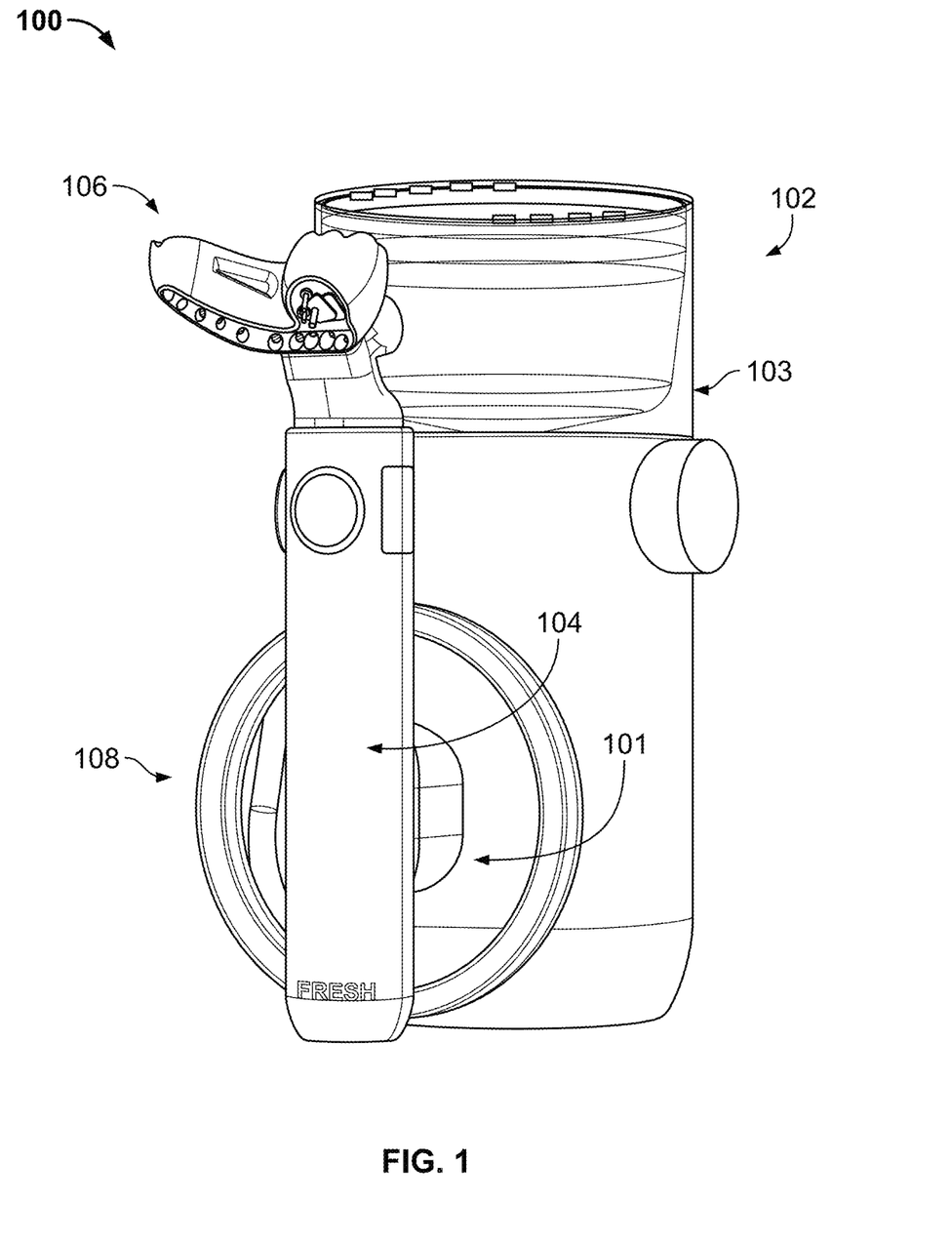
FIG. 1 is a diagram illustrating an oral care system in accordance with some embodiments.

FIG. 1 is a diagram illustrating an oral care system in accordance with some embodiments. In the example shown, oral care system 100 includes base station 102 that is coupled to fluid reservoir 103, handle 104, and a customized oral insert 106 coupled to handle 104. Oral insert 106 may comprise an upper portion and a lower portion that are sized and shaped according to a user's oral cavity. A plurality of fluid nozzles of oral insert 106 are directed toward interproximal spaces between the user's teeth. Oral insert 106 further comprises an effluence conduit located between the upper portion and the lower portion and configured to channel fluid circulating within the user's mouth to an anterior or facial region of the user's oral cavity. One or more fluid conduits 108 may connect fluid reservoir 103 to handle 104, which has a fluid regulator that distributes fluid to oral insert 106. System 100 may optionally comprise charging station 101 for handle 104.

Handle 104 may comprise one or more control buttons (e.g., a start/stop button, a fluid flow adjustment dial). In some embodiments, the one or more control buttons may be located on base station 102. In some embodiments, charging station 101 and handle 104 are optional and oral insert 106 is coupled directly to fluid reservoir 103 via the one or more conduits 108.

Oral insert 106 is customized to a user. That is, oral insert 106 includes a plurality of fluid openings that are arranged in accordance with the unique geometry of the user's oral cavity, gingival geometry, dental structures, and any oral and/or dental devices or implants. Examples of oral and/or dental devices may include, but are not limited to, permanent and removable dental restorations/prosthetics, orthodontic appliances, crows, bridges, implants, braces, retainers, dentures, etc. Each of the fluid openings is positioned to target a specific dental feature. Inside of oral insert 106, the fluid openings may be connected to one or more internal manifolds. The inlets of these manifolds may extend from the back of oral insert 106 in the form of a standardized connector, to which handle 104 and/or conduit 108 may be connected.

Figure 2:
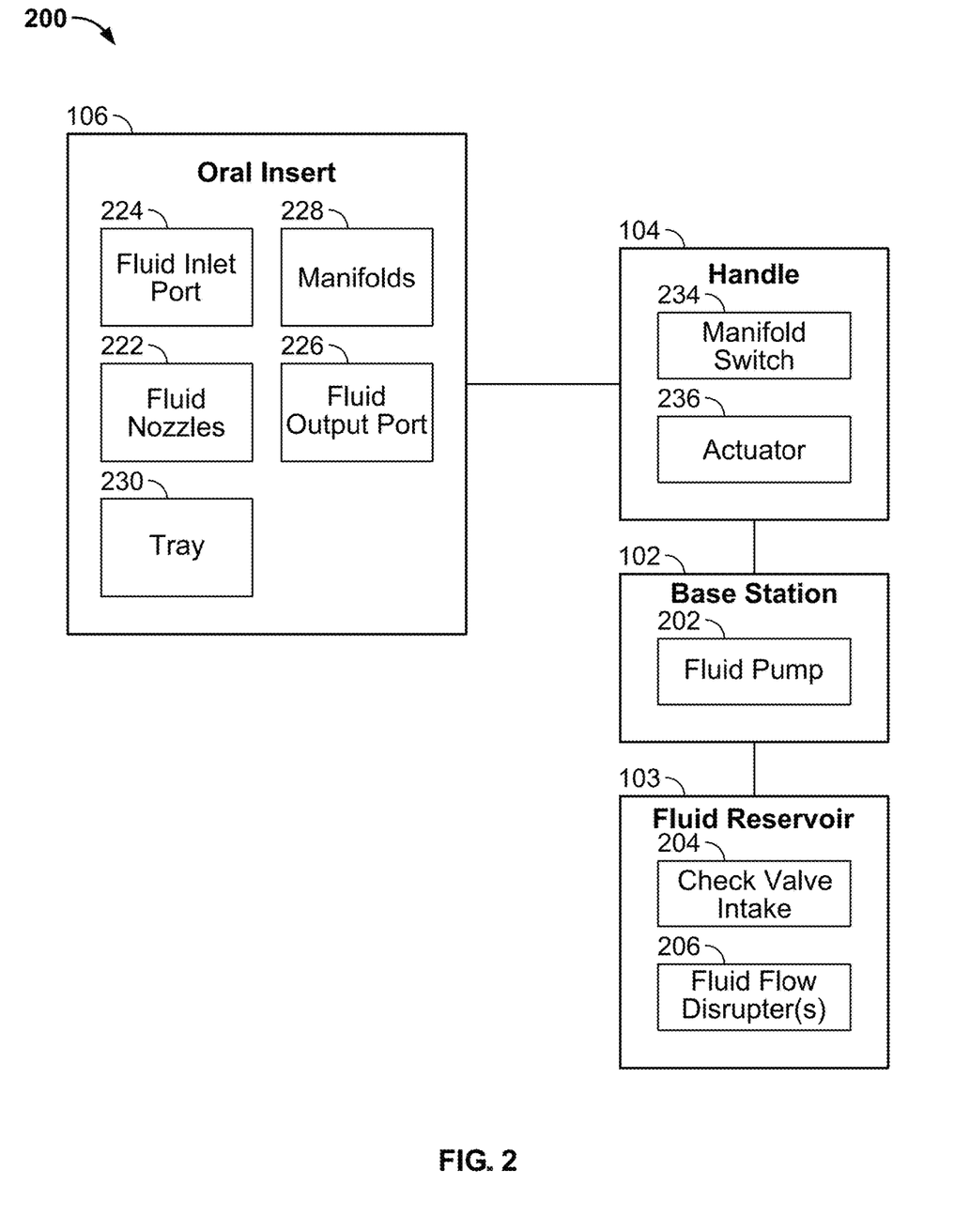
FIG. 2 is a block diagram illustrating an oral care system in accordance with some embodiments.

FIG. 2 is a block diagram illustrating an oral care system in accordance with some embodiments. In the example shown, oral care system 200 includes fluid reservoir 103 that is coupled to base station 102, which is coupled to handle 104. Handle 104 is coupled to oral insert 106.

Oral insert 106 may be releasably engaged with handle 104 and fluid reservoir 103. A user may use handle 104 to manipulate and position oral insert 106 within the oral anatomy of the user. Oral insert 106 may be configured to be in fluid communication with fluid reservoir 103. Oral insert 106 may output a predetermined volume of fluid received from fluid reservoir 103. The rate at which the fluid is outputted from fluid reservoir 103 to oral insert 106 depends on a power rating associated with fluid pump 202. Fluid pump 202 may have a power rating between 180 W to 200 W and may cause the fluid to have a flow rate between 70 ml/s and 100 ml/s. Such a flow rate may be necessary to ensure an effective oral treatment within a predetermined period of time (e.g., less than 10 seconds).

In contrast, a water flosser is designed to clean the oral anatomy of the user over a longer period of time (e.g., 2 minutes). As a result, the pump of a water flosser does not need to be as powerful (e.g., 10 W) as fluid pump 202. The flow rate of water exiting a water flosser reservoir is approximately 10 ml/s.

The fluid structures defined by the oral insert 106 may comprise a fluid inlet port 224, a set of manifolds 228, a set of fluid nozzles 222, and a fluid outlet port (e.g., effluence port) 226. The oral insert 106 may define a tray 230 configured to retain teeth (e.g., upper teeth, lower teeth). The tray 230 may be configured such that at least a portion of the tray 230 corresponds to a shape of the user's teeth.

Oral insert 106 is configured to receive fluid from the fluid reservoir 103 at fluid inlet port 224. Fluid inlet port 224 may be configured to be in fluid communication with the set of manifolds 228 and the set of nozzles 222. In one embodiment, oral insert 106 includes a set of 8 manifolds where each manifold includes 8 nozzles. Fluid output from the set of nozzles 222 may be directed at the user's oral anatomy, for example, through the interproximal spaces between the teeth. A nozzle may be positioned at any location on a manifold. However, the nozzle position is specific to the oral structure of a user. After the fluid passes through and/or irrigates the user's oral anatomy, the fluid may then be guided to the fluid outlet port 226 to exit the user's oral cavity. In some variations, fluid may flow sequentially into fluid inlet 224 and through the set of manifolds 228 and their respective nozzles 222. The set of nozzles 222 may be configured to output fluid toward oral anatomy. Fluid outlet port 226 may then receive the fluid (e.g., effluence) and channel it away from the oral anatomy.

In some embodiments, oral insert 106 is configured to receive fluid from handle 104 and/or fluid reservoir 103. In some embodiments, handle 104 is comprised of a manifold switch 234 and an actuator 236. Manifold switch 234 is configured to select and route fluid into one or more of the manifolds 228. For example, manifold switch 234 may be configured to output fluid sequentially to each manifold at a predetermined rate. This may allow control of fluid flow rates to increase user comfort by preventing an excess volume of pressurized fluid from entering and exiting a user's mouth. Handle 104 may comprise actuator 236 configured to operate one or more of the fluid pump 202 and manifold switch 234.

Base station 102 includes fluid pump 202. Fluid inlet port 224 is coupled to fluid pump 202. Fluid pump 202 is configured to output pressurized fluid from fluid reservoir 103 to oral insert 106. Fluid pump 202 is configured to output pressurized fluid such that a flow rate of the pressurized fluid at each of the fluid nozzles 222 is the same flow rate within a predetermined tolerance. To provide an oral care treatment having a particular efficacy, fluid pump 202 is configured to provide a particular flow rate of fluid having a particular amount of pressure.

In some variations, the fluid reservoir 103 may be configured to hold a predetermined volume of fluid. For example, the fluid reservoir 103 may be configured to hold enough fluid for at least one cleaning cycle. Additionally, or alternatively, the fluid reservoir 103 may be configured to couple to a fluid source to supply and/or augment the fluid held by the fluid reservoir 103.

Fluid reservoir 103 includes a check intake valve 204 and one or more fluid flow disrupters 206. In some embodiments, fluid reservoir 103 has a cylindrical shape. In some embodiments, fluid reservoir 103 has a different shape (e.g., rectangular, pentagon, hexagon, heptagon, octagon, etc.). In some embodiments, check intake valve 204 is located off-centered from a bottom surface of fluid reservoir 103. In some embodiments, check intake valve 204 is located at a center of the bottom surface of fluid reservoir 103.

In some embodiments, fluid is introduced to fluid reservoir 103 at an angle. For example, a user may lean fluid reservoir 103 under a water faucet and fill fluid reservoir 103 at an angle. A user may subsequently turn on oral care system 200 when the liquid is not in a still state by pressing actuator 236 and a vortex may immediately appear in fluid reservoir 103 as a result. In some embodiments, fluid is introduced to fluid reservoir 103. After the fluid in fluid reservoir 103 is in a still state, a user may turn on oral care system 200 by pressing actuator 236 and a vortex may not immediately appear in fluid reservoir 103.

A vortex may cause air (e.g., compressible air bubbles) to be introduced into oral care system 200 via check intake valve 204. This reduces the water pressure exiting the plurality of nozzles 222. As a result, the efficacy of the oral care treatment is reduced. Fluid reservoir 103 includes one or more fluid flow disrupters 206 to prevent a vortex from forming in fluid reservoir 103 or disrupt the vortex that has formed within fluid reservoir 103.

Figure 3A:
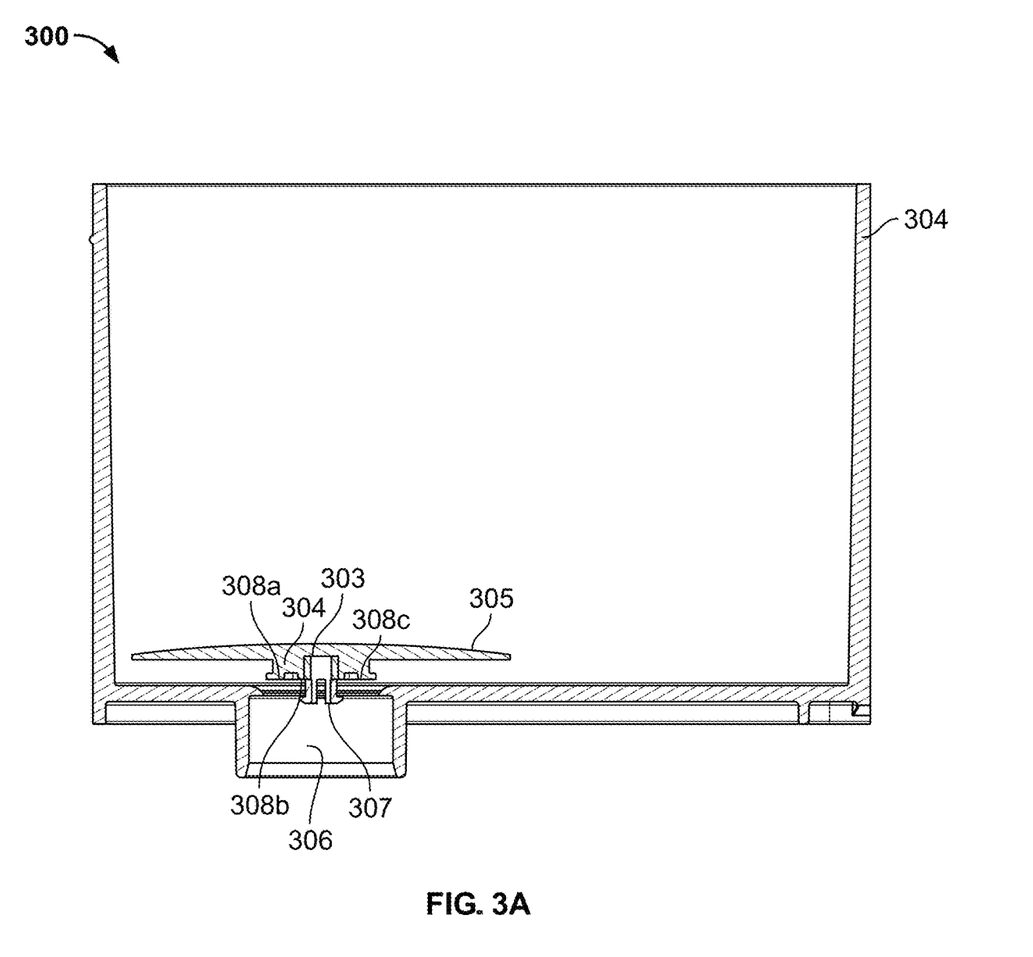
FIG. 3A is a side view of a fluid reservoir in accordance with some embodiments.

FIG. 3A is a side view of a fluid reservoir in accordance with some embodiments. In the example shown, fluid reservoir 300 may be used as a fluid reservoir, such as fluid reservoir 103. Fluid reservoir 300 is comprised of a structure 304 that is coupled to a base station, such as base station 102, via check intake valve 306.

Located on a bottom surface of structure 304 is fluid flow disrupter 305, which includes supports 308a, 308b, 308c. Although fluid flow disrupter 305 is shown with three supports, fluid flow disrupter 305 may include n supports. At least one of supports 308a, 308b, 308c includes a magnetic material 303 (e.g., iron, nickel, cobalt, etc.). In the example shown, support 308b includes the magnetic material 303. Magnetic material may be included in any portion of fluid flow disrupter 305, such as the plate 304 of fluid flow disrupter 305. A magnetic ring 307 is included in check intake valve 306. In some embodiments, fluid flow disrupter 305 includes a magnetic and magnetic ring 307 that includes magnetic material. In some embodiments, both fluid flow disrupter 305 and magnetic ring 307 include magnets.

Figure 3B:
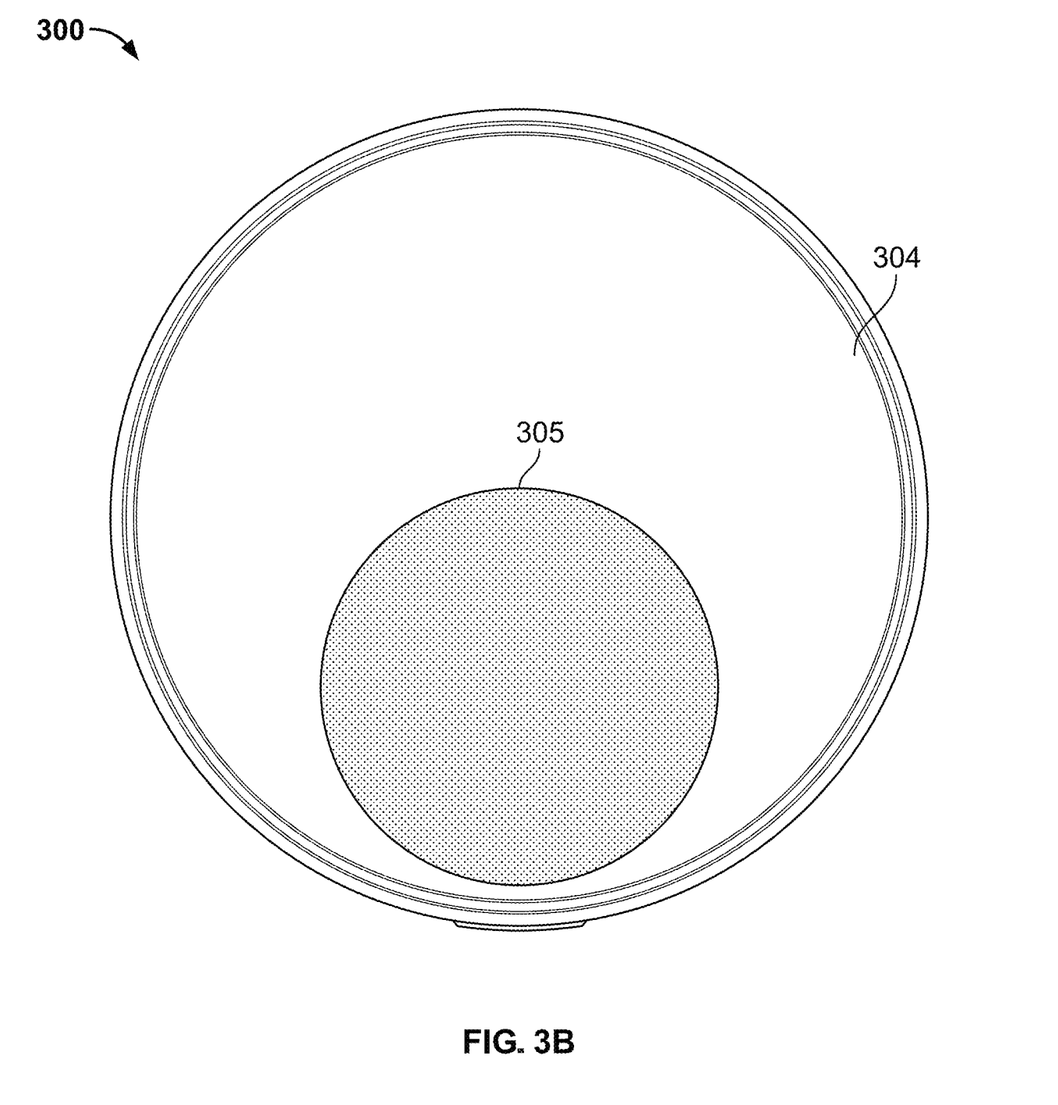
FIG. 3B is a top-down view of a fluid reservoir in accordance with some embodiments.

As seen in FIG. 3B, fluid flow disrupter 305 may be inserted into fluid reservoir 300. FIG. 3B is a top-down view of a fluid reservoir in accordance with some embodiments. The supports 308a, 308b, 308c of fluid flow disrupter 305 may be aligned with magnetic ring 307. When the oral care system is operating, fluid flow disrupter 305 may allow for the lateral flow of fluid from the side so that the fluid flow is not co-linear or co-axial with the direction of fluid flow through check intake valve 306. Fluid flow disrupter 305 may have a diameter that is 2-3 times the size of the diameter of check intake valve 306. For example, check intake valve 306 may have a diameter of 10 mm and fluid flow disrupter 305 may have a diameter that is between 20 mm and 30 mm.

Figure 3C:
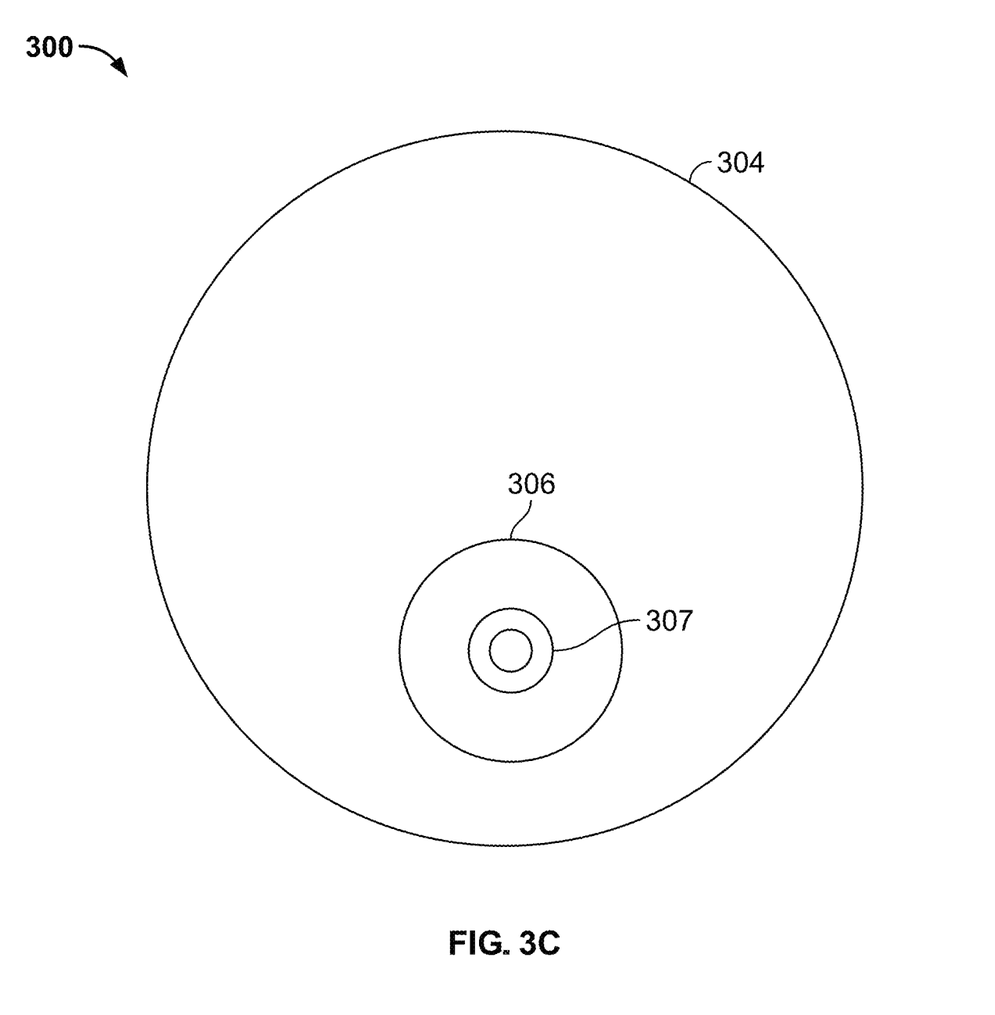
FIG. 3C is a top-down view of a fluid reservoir after a fluid flow disrupter is removed from the fluid reservoir in accordance with some embodiments.

After the oral care system has completed a cleaning cycle, a user may remove fluid flow disrupter 305 from fluid reservoir 300 for cleaning by pulling fluid flow disrupter 305 away from the magnetic ring 307. FIG. 3C is a top-down view of a fluid reservoir after a fluid flow disrupter is removed from the fluid reservoir in accordance with some embodiments.

Figure 4:
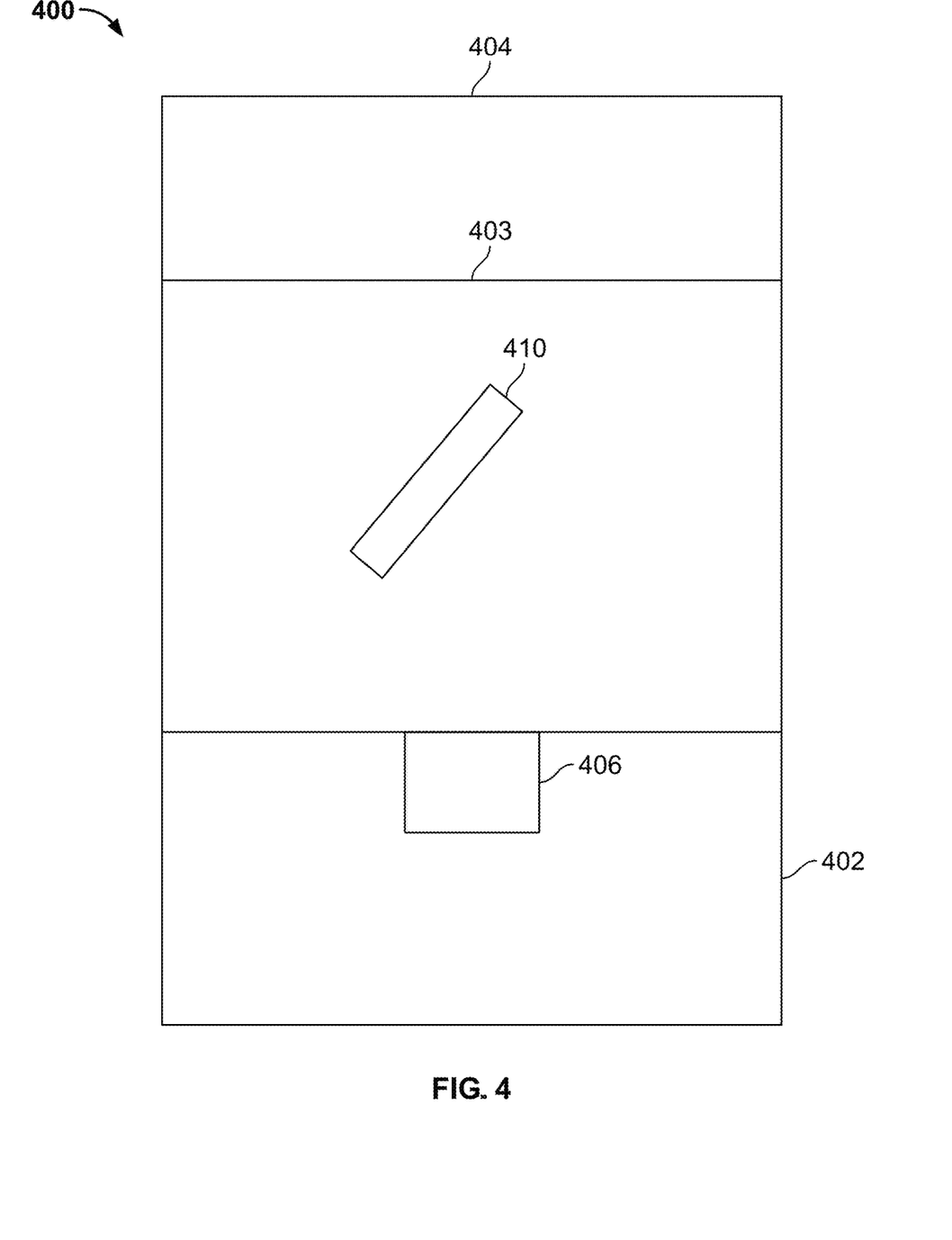
FIG. 4 is a side view of a fluid reservoir in accordance with some embodiments.

FIG. 4 is a side view of a fluid reservoir in accordance with some embodiments. In the example shown, fluid reservoir 400 may be used as a fluid reservoir, such as fluid reservoir 103. Fluid reservoir 400 is comprised of a structure 404 that is coupled to base station 402 via check intake valve 406. When the oral care system is turned on, a pump may cause fluid 403 to be provided from structure 404 to an oral insert via check intake valve 406. Fluid flow disrupter 410 may be submerged in liquid 403 to prevent a vortex from forming within liquid 403 or disrupt an existing vortex in liquid 403.

Figure 5:
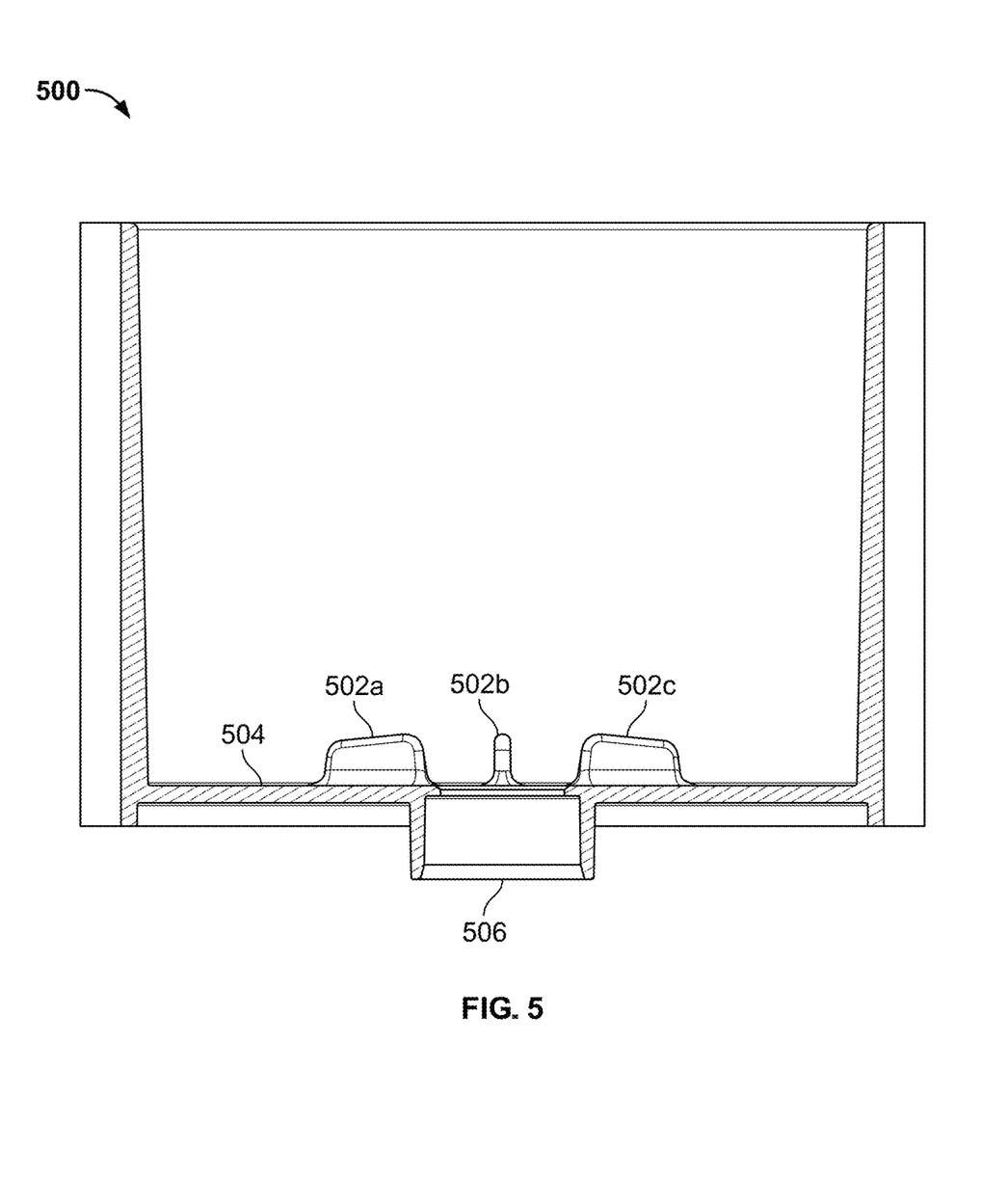
FIG. 5 is a side view of a fluid reservoir in accordance with some embodiments.

FIG. 5 is a side view of a fluid reservoir in accordance with some embodiments. In the example shown, fluid reservoir 500 may be used as a fluid reservoir, such as fluid reservoir 103, in an oral care system. Fluid reservoir 500 includes fluid flow disrupters 502a, 502b, 502c located on a bottom surface 504 of fluid reservoir 500. Fluid reservoir 500 is coupled to check intake valve 506.

The degree to which fluid flow disrupters 502a, 502b, 502c are able to reduce or prevent a vortex from forming within fluid reservoir 500 depends on the manner in which fluid is introduced into fluid reservoir 500. In some embodiments, fluid is introduced to fluid reservoir 500 at an angle. For example, a user may lean fluid reservoir 500 under a water faucet and fill fluid reservoir 500 at an angle. The oral care system is subsequently turned on and a vortex may immediately appear in fluid reservoir 500 as a result. In some embodiments, fluid is introduced to fluid reservoir 500 and the fluid is in a still state. The oral care system is subsequently turned on and a vortex does not appear in fluid reservoir 500.

Fluid flow disrupters 502a, 502b, 502c each have a proximal end that is adjacent to check intake valve 506 and a distal end that is located away from check intake valve 506. A side profile of each of the fluid flow disrupters 502a, 502b, 502c decrease in height from the proximal end to the distal end. In some embodiments, the slope of fluid flow disrupters 502a, 502b, 502c is the same. In some embodiments, the slope of at least one of the fluid flow disrupters is different than the slope of the other fluid flow disrupters.

The ability of the fluid flow disrupters 502a, 502b, 502c to reduce or prevent a vortex from forming within fluid reservoir 500 is based on a height associated with the fluid flow disrupters 502a, 502b, 502c. The ability of the plurality of fluid flow disrupters to reduce or prevent a vortex from forming within fluid reservoir 500 improves as the height associated with the fluid flow disrupters 502a, 502b, 502c increases. In some embodiments, the height of a fluid flow disrupter is between 0.5 cm and 1 cm. In some embodiments, the height of the fluid flow disrupter is 0.75 cm to provide sufficient disruption and for ease of cleaning. In some embodiments, the height of fluid flow disrupters 502a, 502b, 502c is the same. In some embodiments, the height of at least one of fluid flow disrupters is different than the height of the other fluid flow disrupters.

The ability of the fluid flow disrupters 502a, 502b, 502c to reduce or prevent a vortex from forming within fluid reservoir 500 is based on a length associated with the fluid flow disrupters 502a, 502b, 502c. The ability of the plurality of fluid flow disrupters to reduce or prevent a vortex from forming within fluid reservoir 500 improves as the length associated with the fluid flow disrupters 502a, 502b, 502c increases. A length of a fluid flow disrupter is at least 1 cm. In some embodiments, the length of a fluid flow disrupter is between 1 cm and 3 cm. In some embodiments, the length of a fluid flow disrupter is 1.5 cm. In some embodiments, the length of fluid flow disrupters 502a, 502b, 502c is the same. In some embodiments, the length of at least one of fluid flow disrupters is different than the height of the other fluid flow disrupters.

The ability of the fluid flow disrupters 502a, 502b, 502c to reduce or prevent a vortex from forming within fluid reservoir 500 is based on a width associated with the fluid flow disrupters 502a, 502b, 502c. The ability of the plurality of fluid flow disrupters to reduce or prevent a vortex from forming within fluid reservoir 500 improves as the width associated with the fluid flow disrupters 502a, 502b, 502c increases. In some embodiments, a width of a fluid flow disrupter is at least 1 mm. In some embodiments, the width of a fluid flow disrupter is between 1 mm and 5 mm. In some embodiments, the width of a fluid flow disrupter is 2.25 mm. In some embodiments, the width of fluid flow disrupters 502a, 502b, 502c is the same. In some embodiments, the width of at least one of fluid flow disrupters is different than the width of the other fluid flow disrupters.

Figure 6:
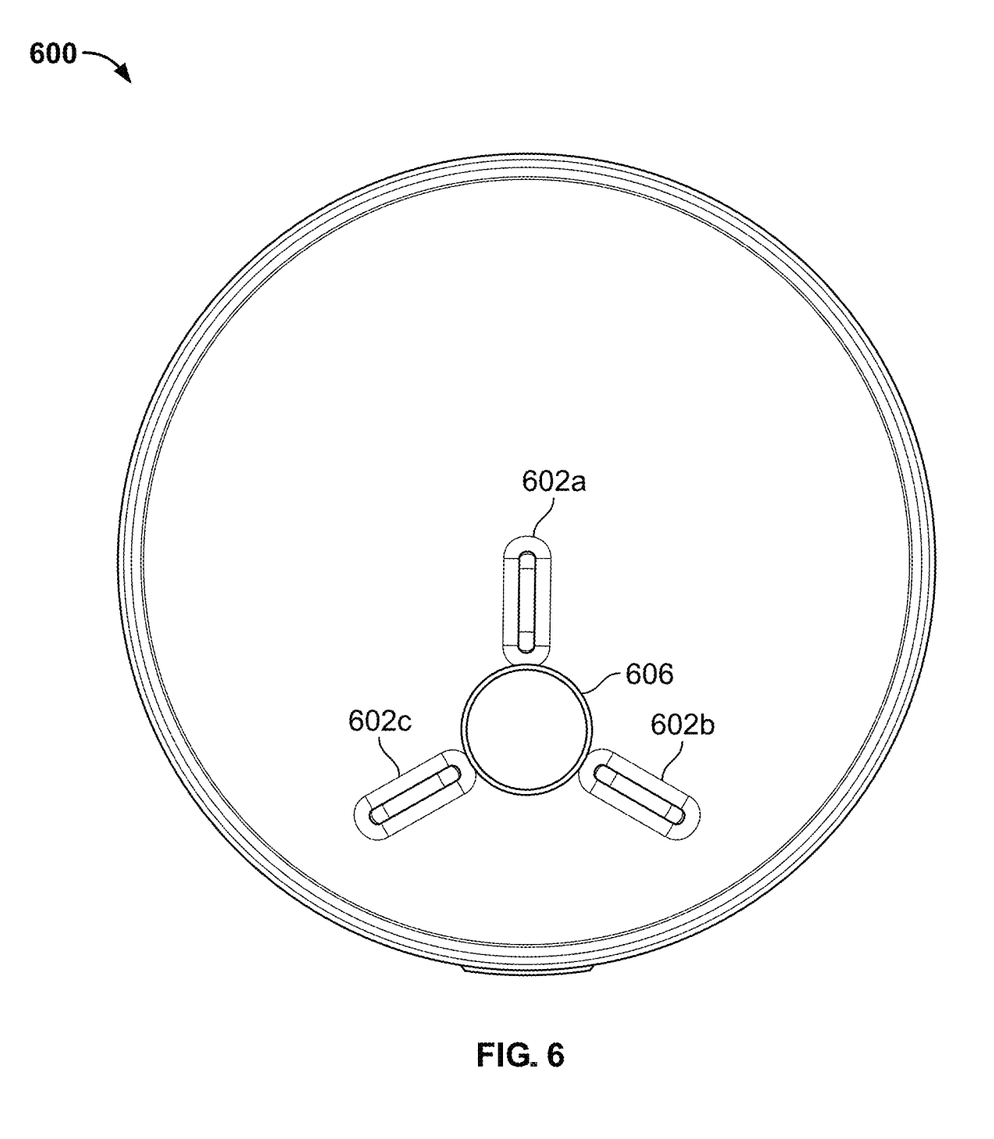
FIG. 6 is a top-down view of a fluid reservoir in accordance with some embodiments.

FIG. 6 is a top-down view of a fluid reservoir in accordance with some embodiments. In the example shown, fluid reservoir 600 may be used as a fluid reservoir, such as fluid reservoir 103, in an oral care system. Fluid reservoir 600 includes fluid flow disrupters 602a, 602b, 602c that surround check intake valve 606. The distal ends of fluid flow disrupters 602a, 602b, 602c are equidistant from a center of check intake valve 606. The proximal ends of fluid flow disrupters 602a, 602b, 602c are also equidistant from a center of check intake valve 606. The center of check intake valve 606 is offset from a center of fluid reservoir 600 because a size of a pump included in the base reservoir may prevent the center of check intake valve 606 from being located at the center of fluid reservoir 600. In some embodiments, the center of check intake valve 606 is located at a center of fluid reservoir 600.

The angle between the fluid flow disrupters and the check intake valve is substantially equal (e.g., within a manufacturing threshold of 1°). For example, a first angle between fluid flow disrupter 602a, fluid flow disrupter 602b, and a center of check intake valve 606 is approximately 120° (e.g., within a manufacturing threshold of 1°). A second angle between fluid flow disrupter 602b, fluid flow disrupter 602c, and the center of check intake valve 606 is approximately 120°. A third angle between fluid flow disrupter 602c, fluid flow disrupter 602a, and the center of check intake valve 606 is approximately 120°.

Figure 7:
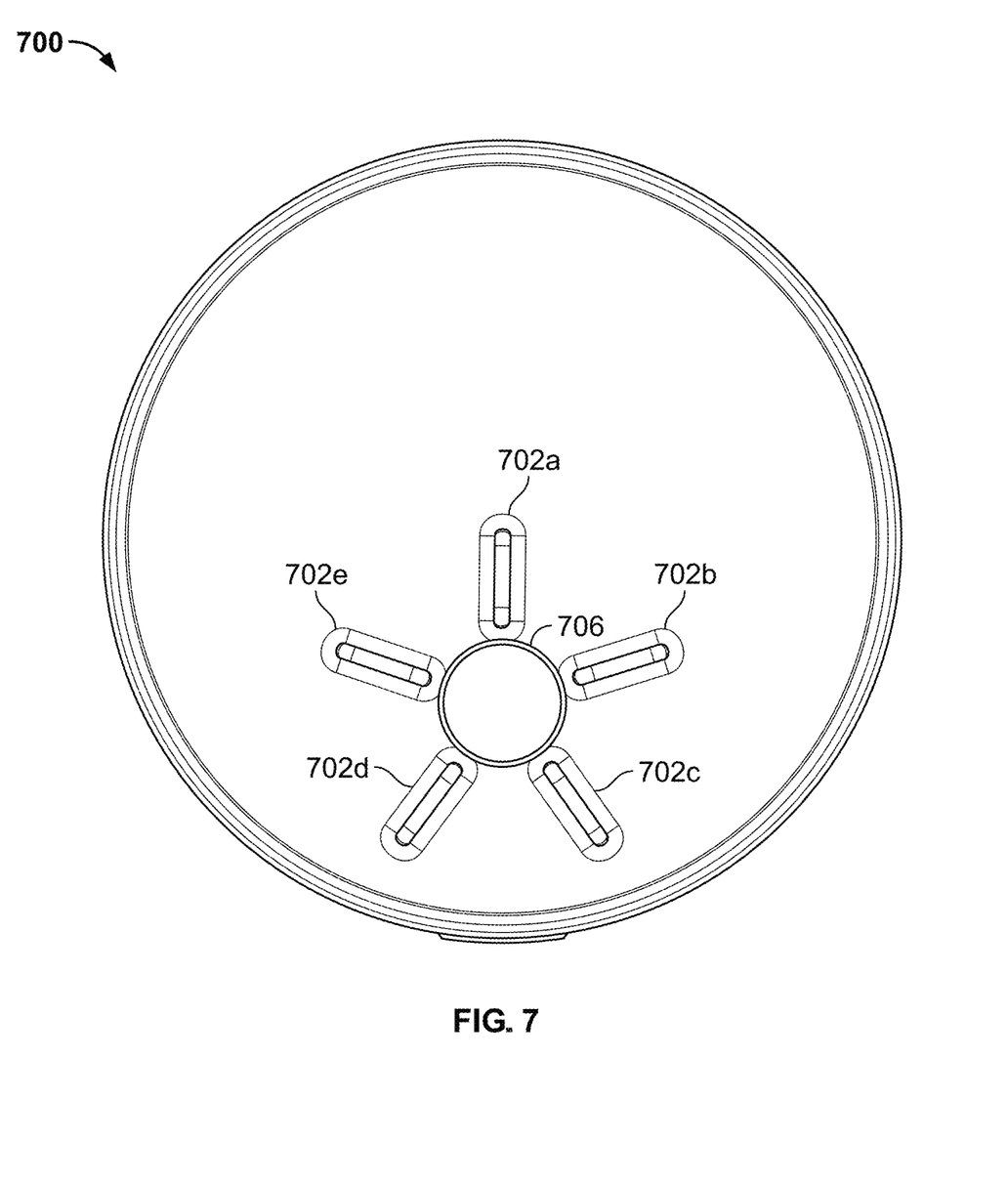
FIG. 7 is a top-down view of a fluid reservoir in accordance with some embodiments.

FIG. 7 is a top-down view of a fluid reservoir in accordance with some embodiments. In the example shown, fluid reservoir 700 may be used as a fluid reservoir, such as fluid reservoir 103, in an oral care system. Fluid reservoir 700 includes fluid flow disrupters 702a, 702b, 702c, 702d, 702e that surround check intake valve 706. The distal ends of fluid flow disrupters 702a, 702b, 702c, 702d, 702e are equidistant from a center of check intake valve 706. The proximal ends of fluid flow disrupters 702a, 702b, 702c, 702d, 702e are also equidistant from a center of check intake valve 706. The center of check intake valve 706 is offset from a center of fluid reservoir 700 because a size of a pump included in the base reservoir may prevent the center of check intake valve 706 from being located at the center of fluid reservoir 700. In some embodiments, the center of check intake valve 706 is located at a center of fluid reservoir 700.

The angle between the fluid flow disrupters and the check intake valve is substantially equal (e.g., within a manufacturing threshold of 1°). For example, a first angle between fluid flow disrupter 702a, fluid flow disrupter 702b, and a center of check intake valve 706 is approximately 72° (e.g., within a manufacturing threshold of 1°). A second angle between fluid flow disrupter 702b, fluid flow disrupter 702c, and the center of check intake valve 706 is approximately 72°. A third angle between fluid flow disrupter 702c, fluid flow disrupter 702d, and the center of check intake valve 706 is approximately 72°. A fourth angle between fluid flow disrupter 702d, fluid flow disrupter 702e, and the center of check intake valve 706 is approximately 72°. A fifth angle between fluid flow disrupter 702e, fluid flow disrupter 702a, and the center of check intake valve 706 is approximately 72°.

Figure 8:
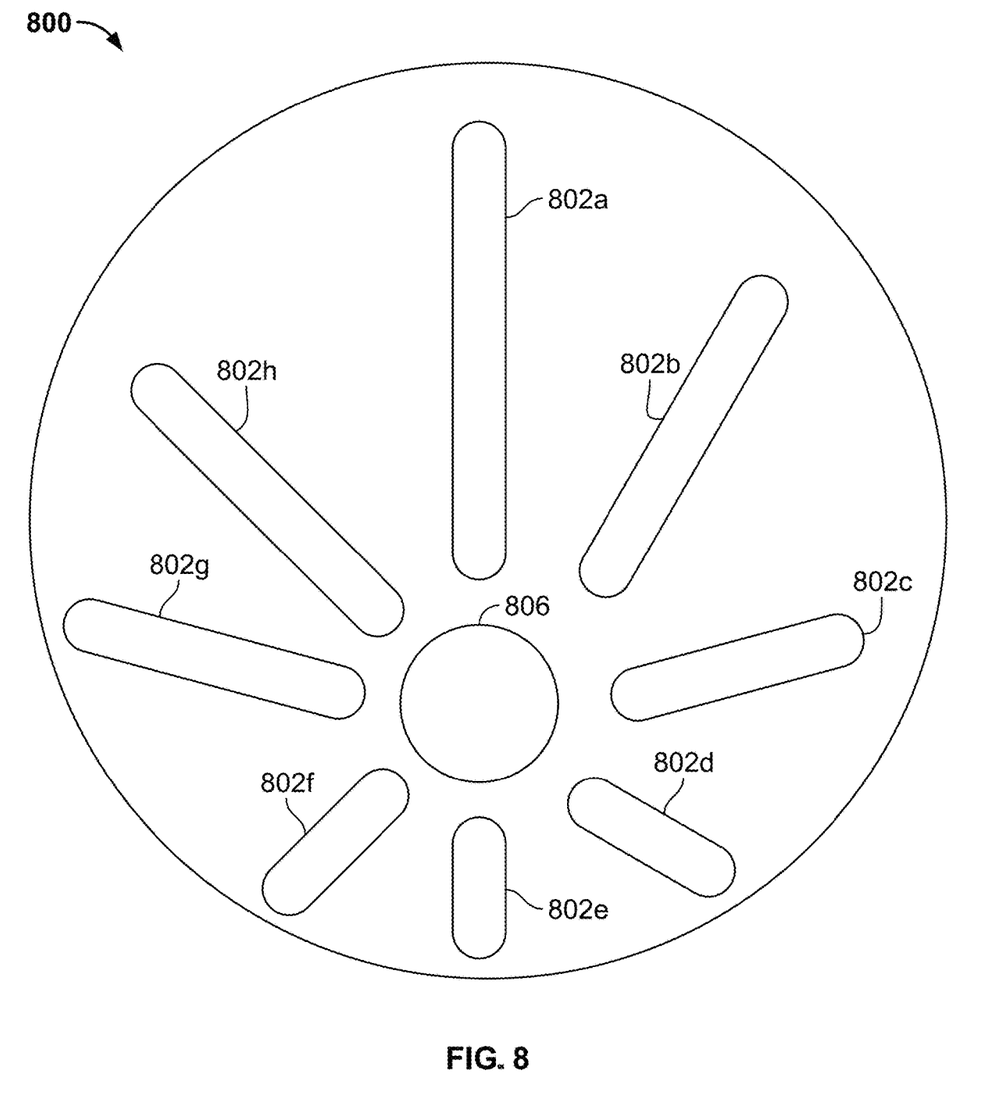
FIG. 8 is a top-down view of a fluid reservoir in accordance with some embodiments.

FIG. 8 is a top-down view of a fluid reservoir in accordance with some embodiments. In the example shown, fluid reservoir 800 may be used as a fluid reservoir, such as fluid reservoir 103, in an oral care system. Fluid reservoir 800 includes fluid flow disrupters 802a, 802b, 802c, 802d, 802e, 802f, 802g, 802h that surround check intake valve 806. The fluid flow disrupters 802a, 802b, 802c, 802d, 802e, 802f, 802g, 802h have different lengths. In some embodiments, at least one of the fluid flow disrupters 802a, 802b, 802c, 802d, 802e, 802f, 802g, 802h has the same length as another of the fluid flow disrupters 802a, 802b, 802c, 802d, 802e, 802f, 802g, 802h.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An oral care system, comprising:
a fluid reservoir comprising a plurality of fluid flow disrupters;
a check intake valve coupled to the fluid reservoir, wherein the check intake valve is located at an offset from a center of the fluid reservoir, wherein a corresponding entire body of the plurality of fluid flow disrupters is located outside a perimeter of the check intake valve; and
a pump to configured to cause fluid to be provided from fluid reservoir to an oral insert of the oral care system via the check intake valve,
wherein the plurality of fluid flow disrupters are integrally formed with a bottom surface of the fluid reservoir and are each free standing with a free upper end, the free upper end of a first fluid flow disrupter of the plurality of fluid flow disrupters having an inclined surface.

2. The oral care system of claim 1, wherein a height of the plurality of fluid flow disrupters decreases from a proximal end of the fluid flow disrupters to a distal end of the fluid flow disrupters.

3. The oral care system of claim 2, wherein the proximal end of the fluid flow disrupters is adjacent to the check intake valve.

4. The oral care system of claim 2, wherein the height of the plurality of fluid flow disrupters is at least 0.5 cm.

5. The oral care system of claim 1, wherein a slope associated with a fluid flow disrupter of the plurality of fluid flow disrupters is zero.

6. The oral care system of claim 1, wherein a length of the plurality of fluid flow disrupters is at least 1 cm.

7. The oral care system of claim 1, wherein a length of the first fluid flow disrupter of the fluid flow disrupters is different than a length of a second fluid flow disrupter of the plurality of fluid flow disrupters.

8. The oral care system of claim 1, wherein a width of the plurality of fluid flow disrupters is at least 1 mm.

9. The oral care system of claim 1, wherein a proximal end of the fluid flow disrupters is equidistant from a center of the check intake valve.

10. The oral care system of claim 1, wherein a distal end of the fluid flow disrupters is equidistant from a center of the check intake valve.

11. The oral care system of claim 1, wherein a number of the plurality of fluid flow disrupters is even.

12. The oral care system of claim 1, wherein a number of the plurality of fluid flow disrupters is odd.

\* \* \* \* \*